United States Patent [19]
Fitchmun

[11] 3,947,550
[45] Mar. 30, 1976

[54] METHOD OF MAKING A SILICON CARBIDE ARTICLE OF LESS THAN FULL DENSITY

[75] Inventor: Douglas R. Fitchmun, Bloomfield Hills, Mich.

[73] Assignee: Ford Motor Company, Dearborn, Mich.

[22] Filed: Aug. 20, 1973

[21] Appl. No.: 389,760

[52] U.S. Cl. .................... 423/345; 264/29; 264/44; 264/63
[51] Int. Cl.² .......................................... C01B 31/36
[58] Field of Search ....:.... 423/345, 346; 264/29, 44, 264/63, 82, 83; 106/44

[56] References Cited
UNITED STATES PATENTS

| | | | |
|---|---|---|---|
| 2,938,807 | 5/1960 | Andersen | 264/63 |
| 3,079,273 | 2/1963 | Johnson | 423/345 X |
| 3,330,892 | 7/1967 | Herrman | 264/63 |
| 3,459,566 | 7/1969 | Wilson, Jr. et al. | 423/345 X |

OTHER PUBLICATIONS

Rubin–*Injection Molding, Theory & Practice*–1972 –pp. 295–301.
Fisher–*Extrusion of Plastics*–1962–pp. 235,253–259.

*Primary Examiner*—Herbert T. Carter
*Assistant Examiner*—Eugene T. Wheelock
*Attorney, Agent, or Firm*—W. E. Johnson; K. L. Zerschling

[57] ABSTRACT

This disclosure teaches a method of making a silicon carbide article of less than full density. A mixture of silicon carbide particles, silicon particles and a thermosetting polymeric material are molded to form an article as a green body. The green body is pyrolyzed to change the polymer into carbon and the carbon is then changed into silicon carbide by the silicon contained in the mixture.

11 Claims, No Drawings

METHOD OF MAKING A SILICON CARBIDE ARTICLE OF LESS THAN FULL DENSITY

BACKGOUND OF THE INVENTION

Silicon carbide is a ceramic of particular interest for structures to be used in zones of high temperature. In a gas turbine engine this material can be used to form such structures as turbine blades and housings exposed to high temperatures. Silicon carbide has good thermal shock resistance characteristics and a high mechanical stability. Also, silicon carbide is strong and is resistant to oxidative degradation under engine operating conditions. Silicon carbide articles of less than full density can also be used in areas where lower strength levels are required, for example as ducts and liner housings.

Prior art U.S. Pat. No. 3,495,939 teaches one process useful for making such articles from reaction bonded silicon carbide. The principal steps taught in the U.S. Pat. No. 3,495,939 are as follows. (1) A mixture is molded which contains 72% by weight alpha-silicon carbide, 28% graphite and a sufficient amount of temporary binder holding the mixture together. The molding of this mixture is carried out by compression molding or extrusion. (2) The temporary binder is totally eliminated by heating the article to a temperature of about 110°C. This heating burns the binder out leaving behind a porous body containing essentially alpha-silicon carbide and graphite. (3) The porous body is treated with silicon in a vacuum induction furnace at temperatures of 1500° to 1600°C and a pressure of 0.5 mm of mercury. Under these conditions, silicon infiltrates the porous body and reacts with the graphite to form beta silicon carbide. This beta silicon carbide phase serves as a bond between the alpha-silicon carbide particles and the resultant article consists essentially of silicon carbide.

The principal drawback with reaction sintering as a manufacturing process for fabricating turbine components is that part geometry needed to satisfy engineering requirements are difficult to mold in compression molding. Also, such components cannot be formed by extrusion. Injection molding is an attractive technique for forming these complex shapes required for turbine engine components but the molding mixtures described in the U.S. Pat. No. 3,495,939 do not flow at polymer processing temperatures and, therefore, cannot be fabricated with conventional plastic processing injection molding techniques and equipments.

SUMMARY OF THE INVENTION

This invention is directed to a method of making silicon carbide articles and, more particularly, to a method of making silicon carbide articles of less than full density having complex shapes with conventional polymer injection molding techniques and equipment.

In general, the method of this invention produces a silicon carbide article in the following manner. A mixture is formed containing 26 to 58 parts by weight of silicon carbide particles, generally having a size range less than about 80 microns, 44 to 25 parts of silicon particles having a size range less than about 180 microns and 30 to 17 parts by weight of a thermosetting polymeric material which originally contains aromatic components or which produces such aromatic components upon pyrolysis and which is a flowable, liquid phase at a temperature of a plastic molding operation.

The mixture so formed is injection molded in the following manner. The mixture is preheated to a temperature whereat the polymeric material is in a liquid phase. The heated mixture is introduced into a mold by an injection molding process. The mold is filled with the introduced mixture and a uniform and constant pressure is developed throughout the mixture within the mold thereby developing a continuous matrix of the polymeric material throughout the mold.

The mixture introduced into the mold is stiffened to form a molded article substantially continuous in the polymeric material. The stiffening of the mixture is accomplished by crosslinking the thermoplastic polymeric material to at least a degree sufficient to permit the molded article to be removed from the mold without substantial distortion thereof.

The polymeric material of the molded article is pyrolyzed to produce a porous body in which the silicon carbide and silicon particles are bonded together by substantially pure carbon. The so-produced porous body is then silicided. The siliciding is accomplished by simply raising the temperature of the porous body above the melting point of the pure silicon. Under these conditions the silicon particles melt and the molten silicon reacts with the carbon formed from the polymer pyrolysis to give beta silicon carbide bonded alpha-silicon carbide. The final product has a thin dense skin overlying a porous body. The final article is, therefore, light in weight, non permeable and highly heat resistant and may be used for articles not requiring high strengths.

One of the essential features of the method of this invention is the selection of the type of organic material utilized for bonding the silicon carbide and silicon particles together. More particularly, the material selected must be one which contains aromatic components or produces such components upon pyrolysis. The aromatic components are essential because these are the components that remain behind to form pure carbon during the pyrolyzing of the material. The pure carbon formulated in the pyrolyzing operation, of course, is the material which later converts to silicon carbide when the internal siliciding operation is carried out. If the organic material selected does not produce such components, it is totally vaporized and burned away in the pyrolyzing operation and there would be no remaining material to convert from carbon to silicon carbide.

Another essential feature of the method is the use of from about 17 to about 30% by weight of the thermosetting material for mixing with the silicon carbide particles. This range is critical because if less than the amount is used, the materials do not flow properly for an injection molding operation. If greater than the specified amount is used, the articles have a tendency to shrink.

With respect to the thermosetting polymeric material used in the method of this invention, some materials which originally contain aromatic components are: phenol furfural, phenol formaldehyde, polybenzimindazole, phenolic-naphtha-lenediol terpolymer and polyphenylenes. Other thermosetting materials which produce aromatic components upon pyrolysis include materials such as polyvinyl chloride, polyvinylidine chloride and polyphenyl polymer. These materials are meant to be illustrative only. The method of this invention includes the use of any thermosetting polymeric material which originally contains aromatic components or produces such aromatic components upon pyrolysis and is in a flowable liquid phase at the temperature of a plastic molding operation.

With respect to the pyrolyzing step, this step may be carried out by positioning the molded article in a chamber with an inert atmosphere. The chamber is slowly heated to a temperature in the range of about 1000°C and the article is allowed to remain therein. During the article's heating to and hold time at temperature, the polymeric material is gradually converted to all aromatic components in that non-aromatic materials are vaporized away. Subsequently, the aromatic components are converted to substantially pure carbon. The pyrolyzed article is either cooled back to room temperature at a cooling rate which does not cause any distortion in the article and retained for later siliciding or continually heated to a reaction sintering temperature.

The siliciding of the article is generally carried out as an internal siliciding operation by positioning the pyrolyzed article in a chamber having an inert atmosphere. The chamber is filled with an inert atmosphere and the body within the chamber is heated to a temperature in the range of 1450° to 1550°C. The body contains a reactable form of silicon and when the silicon particles melt within the body it reacts with the carbon in the body to form silicon carbide. The silicided article is cooled to room temperature at a rate that does not cause distortion or cracking in the article. In the injection molding step a substantial amount of the thermosetting material migrates to the area of the molded article adjacent the mold surface. In the pyrolyzing step the thermosetting material is changed to carbon as described above. Thus, the area adjacent the surface of the article will have a higher concentration of carbon than the interior volume of the article will have. In the internal siliciding step, all the carbon reacts to form silicon carbide. The final article, therefore, will have a relatively dense silicon carbide skin and an internal, porous core. The article will be substantially nonpermeable and will have a high heat resistance but will have lower mechanical strength than a uniformly fully dense article.

DESCRIPTION OF THE PREFERRED EMBODIMENTS

The method of this invention will be demonstrated by several preferred embodiments disclosed in several examples. The materials disclosed in the examples are not intended to limit the scope of this invention. This application teaches the generic principle that any thermosetting polymeric material which originally contains aromatic components or produces such aromatic components upon pyrolysis and is in a flowable liquid phase at temperatures of a plastic molding operation is suitable for forming injection moldable silicon carbide articles.

EXAMPLE 1

An injection molded silicon carbide article of less than full density is formed in the following manner. A molding mixture is prepared by mixing the following dry ingredients in a ball mill for 60 minutes: alpha-SiC, 180 grit U.S. Std. mesh size 39.0 parts by weight, silicon (99.9% pure), 325 grit, 35 parts by weight, phenofurfural phenolformaldehyde copolymer 24.5 parts by weight and 1.5 parts by weight zinc stearate, the zinc stearate being used as a mold release agent.

The molding mixture is fabricated into an article of manufacture on a commercial, reciprocating screw type plastic injection molding machine. Prior to the molding step the powder is extruded and pelletized to increase its ease of feeding into the injection molding machine. The molding conditions are as follows: melt temperature 100°C, mold temperature 170°C, fill time 5 seconds, ram forward time 2 minutes. In the molding operation, the mixture is preheated to a temperature whereat the polymeric material is in a liquid phase. The hot material is introduced into a mold of the injection molding machine. The mold is filled with the introduced mixture and a constant uniform pressure is developed throughout the mixture within the mold whereby a continuous matrix of the polymer material is formulated throughout the mold.

The ram of the molding machine is left in its forward position after the molding operation for a period of 3 to 5 minutes so that the material within the mold will stiffen. At the early part of this time, the polymer forms a smooth surface against the mold wall. The material is stiffened because the thermosetting polymeric material used crosslinks. The crosslinking time, of course, is based upon the type of polymer material used. The polymer material must be stiffened to a degree sufficient to allow the molded article to be removed from the mold without any substantial distortion thereof.

After the molded article is removed from the mold, the green article is a composite of silicon carbide particles, silicon particles and the polymer. The green article is placed in a chamber and is heated to a temperature of 1000°C in an argon atmosphere. This pyrolyzing process is carried out for a 27 hour period and the body is heated to the 1000°C mark at a rate of about 40°C per hour to avoid warping of the green article. Under these conditions the polymer phase loses 42.4% of its weight as gas while the remaining 57.6% is converted to carbon. During this heating operation the non-aromatic components of the polymeric material are driven off as the gas and as the higher temperatures are reached the aromatic components remaining behind are converted to carbon. This carbon serves to hold the silicon carbide silicon particles together. The greatest concentration of the carbon is at or near the surface of the article.

Once the article has been pyrolyzed, it is ready for the next treatment step of the method. In this particular step, the carbon in the pyrolyzed article is converted to silicon carbide. This operation is carried out in a controlled atmosphere furnace having the following conditions. Positive pressure 1 to 2 millimeters of mercury, temperatures 1550°C time at maximum temperature 30 minutes, rate of heating ambient to 1400°C in 2½ hours and 1400°C to final temperature 1.5 hours. Within the controlled atmosphere the silicon in the pyrolyzed article melts. The silicon thus spreads throughout the article by capillary action and is reacted with the carbon to produce silicon carbide as beta silicon carbide and it is in this form because of the temperature at which the reaction takes place.

Some of the characteristics of the material made in this manner are as follows: bulk density of the green body 2.07 gms/cm$^3$; final bulk density of body 1.97 gms/cm$^3$; modulus of rupture on the 3 point bending test 4000–7000 lbs/in$^2$.

Some of the variables in this processing are as follows. A maximum temperature to which the body can be heated in the siliciding may be from 1450° to 1550°C. The time at the maximum temperature may vary from 20 minutes to 60 minutes depending upon the configuration and shape of the article.

Example 2

The procedure of Example 1 is repeated. Formulation of the molding mixture, however, begins with alpha SiC 39.0% by weight (a 75/25 mixture of 325 mesh and 800 mesh powders), silicon (99.7% pure) 325 grit, 35 parts by weight phenolfurfural 24.5 % by weight and 1.5% by weight of zinc stearate. When the procedure of Example is followed 57.8% of the polymer is converted to carbon and ultimately to SiC. The resulting article has a density of 1.96 plus or minus .05 gms/cm$^3$ and a strength in the range from 5,500 to 8,000 lbs/in$^2$.

Example 3

A molding mixture having the following composition is prepared: alpha SiC 39% by weight (a 325 mesh powder), silicon (99.9% pure) 180 grit, 35% by weight, phenolformaldehyde 24.5% by weight and zinc stearate 1.5% by weight. Processing of this molding mixture is in the same manner as described in Example 1. The resulting article has 56.9% of polymer converted to carbon and ultimately to SiC bonded SiC. The resulting article has a density of 1.99 plus or minus 0.05 gms/cm$^3$ and a strength in the range of 4,500 to 7,000 lbs/in$^2$.

Example 4

A molding mixture having the following composition is prepared: alpha SiC 55.0% by weight (325 mesh powder), silicon 325 mesh 26% by weight phenolfurfural 17.5% by weight and 1.5% zinc stearate. Processing of this molding mixture is in the same manner as is described in Example 1 and 56.7% of the polymer is converted to carbon. The ultimate conversion of the carbon to SiC results in a SiC bonded SiC article having a green density of 2.31 gms/cm$^3$ and a fired density of 2.23 plus or minus 0.05 gms/cm$^3$ and a strength in the range of 10,500 to 14,000 lbs/in$^2$.

Example 5

A molding mixture having the following composition is prepared: alpha SiC 26.5% by weight (40/40/20 mixture of 180,320 and 800 mesh powders), silicon (99.9% pure) 325 grit 42% by weight phenolfurfural phenolformaldehyde copolymer 30.0% by weight and zinc stearate 1.5% by weight. This molding mixture is processed in the same manner as described in conjunction with Example 1. In this material 60.2% of the polymer is converted to carbon and ultimately produces SiC bonded SiC article having a green density of 1.89 gms/cm$^3$ and a fired density of 1.79 plus or minus 0.05 gms/cm$^3$ and a strength in the range of 3,800 to 6,500 lbs/in$^2$.

Example 6

A molding mixture having the following composition is prepared: alpha SiC 39.0% by weight (75/25 mixture of 800 and 1000 mesh powders), silicon (99.9% pure) 35% by weight phenolfurfural 24.5% by weight and zinc stearate 1.5% by weight. Processing of this molding mixture is in the same manner as described in Example 1. The processing converts 58.8% of the polymer to carbon and ultimately produces a SiC article having a density of 2.00 plus or minus 0.05 gms/cm$^3$ and a strength in the range of 6,000 to 9,500 lbs/in$^2$.

Example 7

A molding mixture having the following composition is prepared: alpha SiC 39.0% by weight (325 mesh), silicon (99.9% pure) 35% by weight phenolfurfural phenolformaldehyde copolymer 24.5% zinc stearate 1.5% by weight and xylene 1% by weight. This mixture is molded into a green article. During the filling cycle however insufficient material is transferred into the hot mold to produce a solid part. Under these conditions the material expands to fill the excess volume because of its own chemical reaction which give off water vapor and because of the formation of gas from boiling or decomposition of the blowing agent xylene.

Processing of the green article in the manner described in Example 1 converts 57.8% of the polymer to carbon and ultimately produces a SiC bonded SiC article having a density of 1.41 plus or minus 0.05 gms/cm$^3$ and a strength in the range of 1000–3000 lbs/in$^2$. The fired part has a continuous, essentially dense skin and a porous core.

Example 8

A mixture is formed of 25% weight p-polyphenylene base polymer made crosslinkable with propylene glycol, 32.7% by weight alpha-silicon carbide (180 mesh powder), silicon (99.9% pure) 325 mesh 40.8% by weight and 1.5% by weight zinc stearate. This material is transfer molded under the following conditions: melt temperature 185°C, mold temperature 250°C, fill time for mold 15 seconds, material preheat 3 minutes, ram forward 3 minutes, cure time 15 minutes. A green article is carbonized and silicided as discussed in Example 1. Since this polymer converts to high yield of carbon, namely 70–75%, the material has a high final density of 2.11 gms/cm$^3$ and a modulus of rupture in the range of 7,000 to 10,000 lbs/in$^2$.

There has been disclosed herein a method of manufacturing silicon carbide articles of less than full density. Those skilled in the art, in view of this specification, will be able to formulate modifications of this method which will fall within the true spirit and scope of this invention. It is intended that all such modifications fall within the scope of the appended claims.

I claim:

1. A method of making a silicon carbide article which comprises the steps of:
   1. mixing (a) 26 to 58 parts by weight of silicon carbide particles, (b) 44 to 25 parts by weight silicon particles, and (c) 30 to 17 parts by weight of a thermosetting, polymeric material which originally contains aromatic components or produces such aromatic components upon pyrolysis;
   2. molding said mixture formed in step 1, said molding carried out by (a) preheating said mixture to a temperature whereat said polymeric material is in a liquid phase, (b) introducing said heated mixture into a mold, (c) filling said mold with said introduced mixture, and (d) developing a uniform, constant pressure throughout said mixture within said mold thereby to develop a continuous matrix of said polymeric material throughout said mold;
   3. stiffening said mixture introduced into said mold to at least a degree sufficient to permit said molded article to be removed from said mold without substantial distortion thereof;
   4. pyrolyzing said polymeric material of said molded article to produce a body in which said silicon carbide particles and said silicon particles are bonded together by substantially pure carbon; and 5. siliciding said carbon of said body produced in step 4 with said silicon particles of said body to form a finished article of substantially pure silicon carbide, said body being of less than full density.

2. A method of making a silicon carbide article which comprises the steps of:

1. mixing (a) 26 to 58 parts by weight of silicon carbide particles having a size less than about 80 microns, (b) 44 to 26 parts by weight of silicon particles of less than about 180 microns, and (c) 30 to 17 parts by weight of a thermosetting, polymeric material which (i) originally contains aromatic components or produces such aromatic components upon pyrolysis and (ii) is in a flowable, liquid phase at temperatures of a plastic molding operation;

2. injection molding said mixture formed in step 1, said injection molding carried out by (a) preheating said mixture to a temperature whereat said polymeric material is in a liquid phase, (b) introducing said heated mixture into a mold for an injection molding process, (c) filling said mold with said introduced mixture, and (d) developing a uniform, constant pressure throughout said mixture within said mold thereby to develop a matrix of said polymeric material throughout said mold with a greater amount of said polymeric material near the surface of said mold;

3. stiffening said mixture introduced into said mold to form a molded article, said stiffening of said mixture being accomplished by cross linking said thermosetting, polymeric material to at least a degree sufficient to permit said molded article to be removed from said mold without substantial distortion thereof;

4. pyrolyzing said polymeric material of said molded article to produce a porous body in which said silicon carbide particles and silicon particles are bonded together by substantially pure carbon; and 5. siliciding said porous body produced in step 4 with said silicon particles of said body by heating said body in a suitable atmosphere to a temperature at which said silicon particles melt to form liquid silicon which reacts with said carbon thereby to form a finished article of substantially pure silicon carbide, which article has a dense skin and a porous core.

3. The method of making a silicon carbide article as defined in claim 2 wherein: a small quantity of a mold release agent is added to the mixture formed in step 1 to permit easy removal of the molded silicon carbide article from the injection mold.

4. The method of making a silicon carbide article as defined in claim 3 wherein: said mold release agent is zinc stearate.

5. The method of making a silicon carbide article as defined in claim 2 wherein: said polymeric, thermosetting material which originally contains aromatic components is selected from the group of resins consisting of phenol furfural, phenol formaldehyde, polybenzimidazole, phenolicnapthalenediol terpolymer and polyphenylenes.

6. The method of making a silicon carbide article as defined in claim 2 wherein: said polymeric, thermosetting material which produces aromatic components upon pyrolysis is selected from the group of resins consisting of polyvinyl chloride, polyvinylidine chloride, and polyphenyl polymer.

7. The method of making a silicon carbide article as defined in claim 2 wherein: said pyrolyzing step is carried out by: positioning said molded article in a chamber having an inert atmosphere, slowly heating said body to a temperature of about 1000°C thereby progressively to (a) convert said polymeric material to aromatic components and (b) convert said aromatic components to substantially pure carbon.

8. The method of making a silicon carbide article as defined in claim 7 wherein: said body is heated to said temperature of 1000°C at a rate of about 40°C per hours, and wherein said body is cooled from said temperature of 1000°C at a rate of about 40°C per hour.

9. The method of making a silicon carbide article as defined in claim 2 wherein: said siliciding step is carried out by (a) positioning said pyrolyzed body in an heatable chamber, (b) establishing an inert atmosphere in the chamber, (c) heating said body to a temperature in the range of 1450° to 1550°C to melt the silicon particles of the body, (d) reacting said melted silicon particles with said carbon of said body to form a body of silicon carbide, and (e) cooling said silicon carbide body to room temperature.

10. The method of making silicon carbide article as defined in claim 9 wherein: said body is heated from room temperature to a temperature of 1450°C in a period from 2 to 3 hours, wherein said body is heated from 1450° to 1550°C in a period from 1 to 2 hours, and wherein said body is held at said 1550°C for a period of 20 to 40 minutes.

11. A method of making a silicon carbide article which comprises the steps of:

1. mixing (a) 26 to 58 parts by weight of silicon carbide particles, (b) 44 to 25 parts by weight silicon particles, (c) 30 to 17 parts by weight of a thermosetting, polymeric material which originally contains aromatic components or produces such aromatic components upon pyrolysis and (d) a small amount of a blowing agent;

2. molding said mixture formed in step 1, said molding carried out by (a) preheating said mixture to a temperature whereat said polymeric material is in a liquid phase, (b) introducing said heated mixture into a mold, (c) filling less than all of said mold with said introduced mixture, and (d) reacting said blowing agent to developing a uniform, constant pressure throughout said mold;

3. stiffening said mixture introduced into said mold to at least a degree sufficient to permit said molded article to be removed from said mold without substantial distortion thereof;

4. pyrolyzing said polymeric material of said molded article to produce a body in which said silicon carbide particles and said silicon particles are bonded together by substantially pure carbon; and 5. siliciding said carbon of said body produced in step 4 with said silicon particles of said body to form a finished article of substantially pure silicon carbide, said body being of less than full density.

* * * * *